(12) United States Patent
Sato et al.

(10) Patent No.: US 8,389,091 B2
(45) Date of Patent: Mar. 5, 2013

(54) WRAP FILM CONTAINER AND LABEL ADAPTED FOR USE FOR THE CONTAINER AND USED FOR FILM HOLDING SECTION

(75) Inventors: Michihiro Sato, Tokyo (JP); Yoshikazu Amano, Tokyo (JP)

(73) Assignee: Kureha Corporation, Tokyo (JP)

(*) Notice: Subject to any disclaimer, the term of this patent is extended or adjusted under 35 U.S.C. 154(b) by 465 days.

(21) Appl. No.: 12/863,255

(22) PCT Filed: Dec. 18, 2008

(86) PCT No.: PCT/JP2008/073081
§ 371 (c)(1),
(2), (4) Date: Jul. 16, 2010

(87) PCT Pub. No.: WO2009/098826
PCT Pub. Date: Aug. 13, 2009

(65) Prior Publication Data
US 2011/0147430 A1   Jun. 23, 2011

(30) Foreign Application Priority Data
Feb. 5, 2008  (JP) ................. 2008-025053

(51) Int. Cl.
*B32B 9/00* (2006.01)
*B32B 33/00* (2006.01)
*B26F 3/02* (2006.01)
*B65H 35/10* (2006.01)

(52) U.S. Cl. .......... 428/40.1; 428/41.8; 225/39; 225/43; 225/46

(58) Field of Classification Search ................. 428/40.1, 428/41.8, 343, 354; 225/39, 43, 46
See application file for complete search history.

(56) References Cited

U.S. PATENT DOCUMENTS
4,307,828 A   12/1981  Sias et al.
5,050,788 A   9/1991  Taguchi et al.
(Continued)

FOREIGN PATENT DOCUMENTS
EP   0 384 391    8/1990
JP   6-247442     9/1994
(Continued)

OTHER PUBLICATIONS
International Preliminary Report on Patentability issued Sep. 6, 2010 in International (PCT) Application No. PCT/JP2008/073081.
(Continued)

*Primary Examiner* — Patricia Nordmeyer
(74) *Attorney, Agent, or Firm* — Wenderoth, Lind & Ponack, L.L.P.

(57) ABSTRACT

A wrapping film container, including: an elongated container body for housing therein a rolled self-tacky wrapping film, an opening provided to the container body along a longitudinal direction of the container body for pulling out a portion of the wrapping film therethrough, cutting means for cutting the pulled-out portion of the wrapping film and a film-holding section provided on a front face of the container body for preventing re-winding to an inside of the container, wherein the film-holding section comprises a laminate structure including a pressure-sensitive adhesive layer, a substrate layer, an adhesive layer and a self-tacky film layer, disposed sequentially from the container body side. The film-holding section is efficiently formed on the front face of the container body by using a label for forming film-holding section of a wrapping film container having a laminate structure including a self-tacky film layer, an adhesives layer, a base material layer, a pressure-sensitive adhesive layer and a separator layer, disposed sequentially from one side thereof, and exhibits a stable and consistent film-holding power.

7 Claims, 1 Drawing Sheet

U.S. PATENT DOCUMENTS

| | | | |
|---|---|---|---|
| 5,884,763 A | 3/1999 | Ozawa | |
| 6,299,966 B1 * | 10/2001 | Bonke et al. | 428/173 |
| 6,416,835 B1 * | 7/2002 | Preston et al. | 428/40.1 |
| 6,432,241 B1 * | 8/2002 | Congard et al. | 156/157 |
| 2003/0080005 A1 * | 5/2003 | Toussant et al. | 206/225 |

FOREIGN PATENT DOCUMENTS

| | | |
|---|---|---|
| JP | 6-270935 | 9/1994 |
| JP | 7-329959 | 12/1995 |
| JP | 8-26236 | 1/1996 |
| JP | 10-35657 | 2/1998 |
| JP | 10-258818 | 9/1998 |
| JP | 11-227757 | 8/1999 |
| JP | 2001-66995 | 3/2001 |
| JP | 2003-279312 | 10/2003 |
| JP | 2007-144705 | 6/2007 |
| JP | 2008-265839 | 11/2008 |

OTHER PUBLICATIONS

International Search Report issued Mar. 31, 2009 in International (PCT) Application No. PCT/JP2008/073081.

Supplementary European Search Report issued Aug. 6, 2012 in corresponding European Patent Application No. 08872259.0.

* cited by examiner

WRAP FILM CONTAINER AND LABEL ADAPTED FOR USE FOR THE CONTAINER AND USED FOR FILM HOLDING SECTION

TECHNICAL FIELD

The present invention relates to a wrapping film container for housing a rolled wrapping film and cutting the film drawn out of the container little by little for packaging of food, etc., particularly to a technique for efficiently forming a film-holding section of the container for stably and consistently preventing the rewinding of a cut film end after cutting to the inside of the container, and moreover to a wrapping film container having such a film-holding section, and a label structure for efficient formation of the film-holding section.

BACKGROUND ART

A wrapping film used for packaging of food, etc., by pulling out a rolled self-tacky film little by little from the container and cutting it for packaging of food, etc., is very convenient as a packaging medium used at cooking places, but because of its self-tackiness, once it rewinds into the container, it becomes considerably difficult to peel off and pull the end thereof stuck to the roll body out of the container for re-use thereof. For this reason, it has been a frequently adopted practice to form a film-holding section on the front face of the container body for holding a wrapping film end after cutting so as to allow re-peeling thereof for easier continual use of the wrapping film roll. As such a film-holding section, it has been known to form a layer of a pressure-sensitive adhesive comprising a mixture of an ethylene-vinyl acetate copolymer grafted with vinyl chloride monomer and acrylic resin (Patent document 1) or a layer of a pressure-sensitive adhesive comprising a cured product of a composition comprising a polyurethane elastomer and an acrylic resin (Patent document 2). However, the use of such a pressure-sensitive adhesive is accompanied with difficulties, such as difficulty in control of adhesive power, causing an excessive strength leading to film cutting or lowering in film-holding capability due to attachment of dust or dirt with continuation of use thereof, and also a change in film-holding capability due to an environmental temperature change.

Then, the present applicant formed a film-holding section by applying a wrapping film on a front face of the container so as to utilize a self-tackiness of the wrapping film per se and found that the thus-formed film-holding section exhibited an appropriate level of stable film-holding capability which was little affected by an environmental temperature change and suffered little from deterioration with time, thereby having proposed a wrapping film container having such a film-holding section (Patent document 3). However, such a self-tacky film is generally as thin as about 5-20 μm and is extremely rich in flexibility, so that application thereof is encountered with considerable inconveniences, such as waving and adhesion failure or turning at edges, even in a case where the film is applied onto a front face of the container on which an adhesive or a pressure-sensitive adhesive is applied in advance or a case where a self-tacky film coated on its surface with a pressure-sensitive adhesive layer is applied onto a front face of the container, and because of these inconveniences, it has been found difficult to form a film-holding section exhibiting a stable film-holding capability.

[Patent document 1] JP-A 6-270935

[Patent document 2] JP-A 10-35657

[Patent document 3] JP-A 2008-265839

DISCLOSURE OF INVENTION

Accordingly, a principal object of the present invention is to provide a technology for efficient production of a film-holding section, exhibiting a stable and continuous film-holding power, of a wrapping film container.

According to the present inventors' study for achieving the above-mentioned object, it has been found very effective to dare re-form a self-tacky film, which can be applied by itself onto a front face of the container by use of an adhesive or a pressure-sensitive adhesive, into a label structure including a pressure-sensitive adhesive, a substrate and a separator.

Thus, the present invention provides a label for forming a film-holding section of a wrapping film container, having a laminate structure, including from one side thereof, a self-tacky film layer, an adhesives layer, a substrate layer, a pressure-sensitive adhesive layer and a separator layer.

Moreover, the wrapping film container of the present invention formed by using such a label, comprises: an elongated container body for housing therein a rolled self-tacky wrapping film, an opening provided to the container body along a longitudinal direction of the container body for pulling out a portion of the wrapping film therethrough, cutting means for cutting the pulled-out portion of the wrapping film and a film-holding section provided on a front face of the container body for preventing re-winding to an inside of the container, wherein the film-holding section comprises a laminate structure including a pressure-sensitive adhesive layer, a substrate layer, an adhesive layer and a self-tacky film layer, disposed sequentially from the container body side.

According to the present invention, it has become possible to form a film-holding section comprising an applied layer of a self-tacky film on a relatively small area of the front face of a wrapping film container not by individually handling a small area of very flexible self-tacky film but by using a labeler having a mechanism for removing the separator so as to apply a label-form film-holding section automatically and continuously onto a plurality of base sheet stocks for forming wrapping film containers. Moreover, although the self-tacky film is excessively flexible for being applied by itself, it is held in a state of ensuring its planarity on a label substrate, so that it is possible to easily and stably form a film-holding section which is free from instability of film-holding power due to waving.

Figure 1:
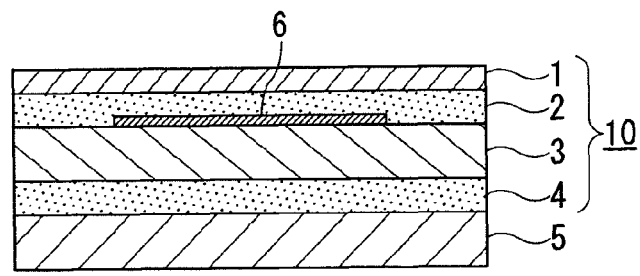
FIG. 1 is a lamination sectional view of an embodiment of the label for formation of a film-holding section of the present invention.

In the figures, reference numerals and symbols represent the following items.

1: self-tacky film layer, 2: adhesives layer, 3: substrate layer, 4: pressure-sensitive adhesive layer, 5: separator, 6, 7: label detection mark, 8: slit for stamping a label to be applied, 10: label to be applied, 10a: film-holding section, 20: wrapping film container body (21: front face of the container body, 22: enveloping flap), 30: rolled wrapping film, 40: base tape material for providing elongated label tape, H: saw teeth-shaped cutting edge.

BEST MODE FOR PRACTICING THE INVENTION

The label for forming a film-holding section of a wrapping film container of the present invention has a laminate structure as shown in a sectional view of FIG. 1 including a self-tacky film layer 1, an adhesive layer 2, a substrate layer 3, a pressure-sensitive adhesive layer 4 and a separator layer 5, as a most basic structure, and preferably includes also a printing layers 6, such as a detection mark representing the holding section, on the substrate layer 2.

The self-tacky film 1 generally comprises a resin composition similar to that of a self-tacky film constituting the wrapping film accommodated in a wrapping film container, that is, a composition comprising a thermoplastic resin, such as polyvinylidene chloride, polyvinyl chloride, polyethylene, polypropylene, polymethylpentene or polyester, and a plasticizer, such as an aliphatic polybasic acid ester, an aliphatic polyhydric alcohol ester or an oxyacid ester, blended in an amount of about 0.1 to 20 wt. % with the thermoplastic resin, preferably a blend of polyvinylidene chloride with a plasticizer. The self-tacky film layer 1 can have a thickness selected from a broad range from a viewpoint of exhibiting an adhesive holding power against the wrapping film but may preferably comprise a wrapping film per se for an economical reason, thus generally in a thickness of 5-20 μm.

The adhesive layer 2 between the self-tacky film 1 and the label substrate 3, may appropriately comprise a solvent-type, a non-solvent-type or an emulsion-type adhesive comprising a base resin of an acrylic resin, a vinyl acetate resin, an epoxy resin, a synthetic rubber, etc., and may preferably be an aqueous emulsion-type adhesive or an ultraviolet-curable non-solvent-type adhesive comprising an acrylic base resin which is excellent in productivity and does not need treatment of a waste solvent. The adhesives layer 2 may suitably have a thickness of about 5-50 μm.

The pressure-sensitive adhesive forming the pressure-sensitive adhesive layer 4 may be one which is generally disposed between a label substrate and a separator for label formation, that is, a pressure-sensitive adhesive comprising, e.g., a rubber-based, a polyurethane-based or an acrylic resin-based visco-elastic base polymer, to which a tackifier resin of rosin, petroleum resin, etc., is added. Generally, the thickness of the pressure-sensitive adhesive layer 4 is a little thicker than the thickness of the adhesives layer 2, and is about 10-100 μm.

The label substrate 3 governs the rigidity of the label 10 stuck on the front face of the wrapping film container body, and may comprise paper or a plastic film which is generally used for constituting a label substrate and has a larger rigidity than the self-tacky film 1. The thickness thereof is generally about 25-200 μm.

The separator 5 generally comprises paper or a plastic film which is stiffer (i.e., less easily bent) and thicker than the label substrate 3 and has a boundary surface with the pressure-sensitive adhesive layer 4 showing a releasability from the layer 4, e.g., by applying thereon a release agent, such as a silicone resin. As far as being releasable from the label part including the pressure-sensitive adhesive layer 4, however, the separator 5 my basically have a rigidity and a thickness which can be arbitrarily set.

Figure 2:
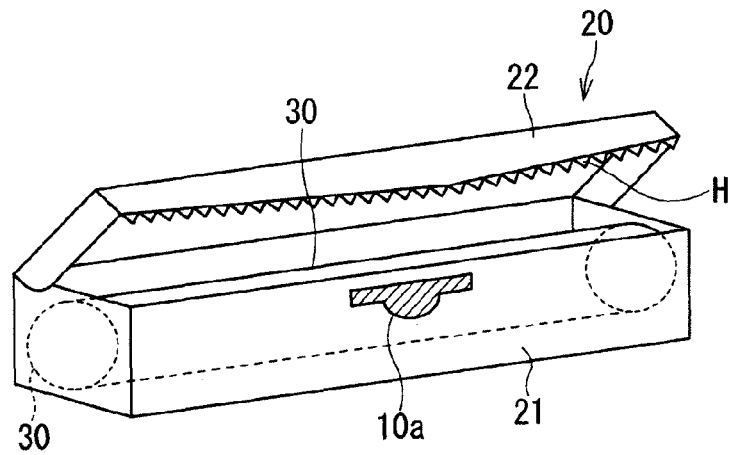
FIG. 2 is a schematic perspective view of an embodiment of the wrapping film container of the present invention.

By sticking the label part 10 to be applied onto a front face of a wrapping film container body while peeling off the separator 5 from the label structure for forming a film-holding section having the above-mentioned laminate structure, the wrapping film container of the present invention is obtained, FIG. 2 is a schematic perspective view of an embodiment of the wrapping film container in an open state of the present invention obtained in the above-described manner. Referring to FIG. 2, the wrapping film container of this embodiment accommodates a rolled wrapping film 30 wound about a core material (not shown in particular) in an elongated container body 20 having a shape of a laterally elongated parallelepiped as a whole, and is formed by sticking a film-holding section 10a on a front face 21 of the container body. According to the present invention, the film-holding section 10a is formed of the applied label part 10 comprising the self-tacky film layer 1, the adhesives layer 2, the substrate layer 3 and the pressure-sensitive adhesive layer 4, described with reference to FIG. 1.

The container body 20 of this embodiment has an enveloping flap 22 equipped along a lower end thereof with a saw teeth-form film-cutting edge H having an overall shape of character "V". In the state as shown of the enveloping flap 22 being opened upward, an end of the wrapping film 30 wound in the form of a role is pinched and pulled out in a required length of the wrapping film, and then the wrapping film is pushed against the film-holding section 10a with a portion near the cutting edge of the fallen-down enveloping flap 22. Then, the wrapping film in the required length is cut off by the cutting edge H to wrap food etc. The end of the rolled wrapping film 30 remaining after the cutting is held on the film-holding section 10a by the self-tackiness of the film-holding section 10a, and is used as an end for pulling-out of the wrapping film in a subsequent use.

The manner of using a wrapping film by use of such a wrapping film container as described above is well-known in itself from Patent document 2, JP-A 10-35657, etc., and more detailed explanation will probably be unnecessary.

Various embodiments of modifications are also well-known as described in the above-mentioned patent documents, inclusive of, e.g., a cutting edge H which may be of a straight line as a whole instead of a whole shape of character "V" in the above embodiment; and a film-holding section 10a which is longer as to extend over a longitudinal direction of the container body 20 or shorter than a preferable one shown in FIG. 2 which has a lower part shape including a projection so as to allow easy separation of the separator. Generally, the film-holding section 10a may preferably be disposed in an area of about 1-30% of the front face 21 of the container body.

Although the container body 20 has a form of a laterally elongated parallelepiped in use as mentioned above, it is generally formed by bending a cardboard developed in a planar form, as is well known (from, e.g., the above-mentioned JP-A 10-35657). Therefore, the application of a label part 10 for forming the film-holding section 10a may be performed on a part on the planar cardboard corresponding to the front face 21 of the container body 20. As a result, it becomes possible to stick the label part 10 onto parts of such a planar cardboard stock corresponding to a plurality of container bodies 20 continuously while peeling off the separator 5. Many of such methods for continuous application of labels and labelers (labeling machines) therefor are known from, e.g., JP-A 8-26236, JP-A 10-258818, etc., and are also applicable to continuous application onto a planar cardboard stock of the wrapping film container body by using the label for forming the film-holding section of the present invention. For application to such continuation application or pasting embodiments, it is necessary to use an elongated label feed-stock which has been formed by converting the label for forming a film-holding section having a structure described with reference to FIG. 1 into an elongated form including an elongated separator 5 and having thereon a plurality of discrete label parts to be applied 10 each having the laminate structure of the self-tacky film layer 1, the adhesives layer 2, the substrate layer 3 and the pressure-sensitive adhesive layer 4. It can be however appropriately selected as desired as to whether the refuse portions around the film-holding sections 10a to be stuck on the cardboard stock corresponding to the front part 21 of the container body are removed in a conventional manner in advance of the continuous label application or pasting operation, or the refuse portions are formed and removed in a continuous labeling machine (labeler), in parallel with the continuous label application (e.g., as disclosed in JP-A 10-258818).

EXAMPLES

Figure 3:
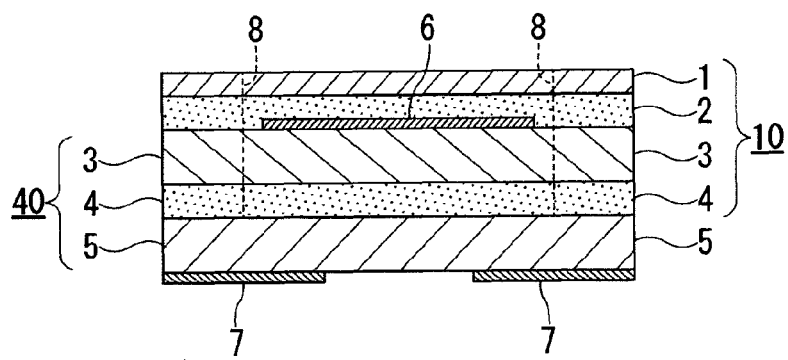
FIG. 3 is a lamination sectional view of an embodiment (for automatic application) of the label for forming a film-holding section of the present invention.

Labels each having a layer structure as shown in FIG. 3 suitable for automatic label application by means of a labeler were formed in an elongated form, although the structure was basically similar to the one shown in FIG. 1. In FIG. 3, similar portions as shown in FIG. 1 are denoted by the same reference numerals as shown in FIG. 1.

With reference to FIG. 3, a 50 μm-thick polypropylene (OPP) substrate film 3 and a 88 μm-thick release paper 5 were bonded to each other with a 20 μm-thick acrylic resin-based pressure-sensitive adhesive layer 4 to provide an elongated tape feedstock 40 of 158 μm in total thickness, 230 mm in width and 400 m in length, in advance. While winding off a roll of the tape feedstock 40, there were consecutively printed an eye-mark 7 (a mark for consecutive peeling-off of the release paper 5 for individual labels by an automatic label application machine) with a UV-curable black ink on a backside of the release paper 5, and a detection mark 6 (for subsequent confirmation by the automatic label application machine of label application position on a cardboard for forming a carton (i.e., wrapping film container) and also for confirmation by a wrapping film user of a film-holding section 6a on the carton) with a UV-curable green ink on the front surface of the substrate film 3, followed by curing of the UV-curable inks. While the tape feedstock 40 was consecutively fed, an acrylate copolymer-based UV-curable clear adhesive ("ACRYTACK T-1050, made by No-tape Kogyo K.K.) was applied with a roller in a thickness of about 10 μm on the surface of the substrate film 3, and further thereon a 10 μm-thick polyvinylidene chloride-based wrapping film ("NEW Krewrap", made by Kureha Corporation) of 220 mm in width and 1000 m in length was laminated while being wound off a roll thereof, followed by UV-curing of the adhesive to provide a primary label feedstock tape having a laminate structure substantially as shown in FIG. 3. Then, the primary label feedstock tape was further caused to run and provided with slits 8 (FIG. 3) piercing through the wrapping film 1 to the pressure-sensitive adhesive layer 4 except for the release paper 5 in the form of individual labels 10a of FIG. 2 and, after removing the surrounding unnecessary (refuse) portions, was slit into 6 divisions which were then separately wound into rolls, thereby providing 6 elongated label feedstocks each having a width of 34 mm and a length of 400 m and including about 16000 individual labels for automatic label application. Each label feedstock thus-obtained was confirmed to be suitably usable for automatic application of individual labels 10a at prescribed positions on cardboard stocks for forming cartons for a housing wrapping film ("NEW Krewrap", made by Kureha Corporation) by means of an automatic label applicator ("S60J Labeler", made by Nissho Denki K.K.).

It was confirmed that the wrapping film-holding sections 10a thus applied at prescribed positions on the cardboard for forming a wrapping film storage carton were free from defects, such as waving, or adhesion failure or turn-up at the edges, and confirmed to be very flat wrapping film-holding sections.

A cardboard for forming a wrapping film storage carton thus provided with the label 10a (30 mm in width) for holding a wrapping film, and a wrapping film ("NEW Krewrap", made by Kureha Corporation) to be held therein, were stored for 1 hour in environment of 10° C. and 23° C., respectively. Then, in the identical environments, the wrapping film was placed on and pressed against the label by a roller of 2 kg, followed by measurement of a T-peel adhesion strength (at a peeling angle of 90 degrees) and a shear adhesion strength (at a peeling angle of 0 degree) between the wrapping film and the label. For comparison, also the film-holding section comprising a cured film of a composition comprising a polyurethane prepolymer and non-reactive acrylic resin as disclosed in Patent document 2 (called "Cured SP varnish film") was subjected to simile measurement of T-peel adhesion strength and shear adhesion strength with the wrapping film. The results (respectively average with respect to five samples) were as shown in the following table 1.

TABLE 1

|  | T-peel adhesion strength (g-f) | | Shear adhesion strength (g-f) | |
|---|---|---|---|---|
|  | 10° C. | 23° C. | 10° C. | 23° C. |
| Cured SP varnish film | 38.8 | 72 | 1728 | 1168 |
| Label | 1.5 | 2 | 1585 | 940 |

Compared with the cured SP varnish film, the film-holding section formed of a label including a surface layer of the wrapping film per se according to the present invention showed a very small T-peel adhesion strength regardless of a temperature change, and also a shear adhesion strength value close to a range of 700-1500 g-f which is an empirically ideal range from the viewpoint of an appropriate degree of holding power and prevention of cutting of a wrapping film, respectively with respect to the wrapping film.

Further, as a practical test, a wrapping film container carton 20 as shown in FIG. 2 was formed according to a prescribed manner from a cardboard for forming a wrapping film container carton prepared as described above including a wrapping film-holding section applied at a prescribed portion, a roll 30 of a polyvinylidene chloride-based wrapping film of 300 mm in width and 20 m in length ("NEW Krewrap", made by Kureha Corporation) was stored as shown in FIG. 2, and 300 cycles of packaging (wrapping) operations were performed with each cycle including an ordinary manner of pulling-out, cutting and wrapping of food, etc. (more specifically, a cycle including pulling-out in a length of 20 cm and cutting thereof was repeated at a rate of once in a minute by re-filling the wrapping film roll 30 in the same carton as required, until a totally 60 m of the wrapping film was used up). As a result, it was confirmed that the film-holding section 10a showed very good resistance to the re-winding power exerted as a shearing force acting parallel to its surface while showing little adhesion resistance to peeling in the direction perpendicular to its surface (T-shape peeling), thus allowing a very smooth performance of a series of packaging operations. Moreover, almost no change was observed in film retention capacity of the film-holding section 10a during the operations.

INDUSTRIAL APPLICABILITY

As described above, according to the present invention, a wrapping film having properties preferable for providing a film-holding section of a wrapping film container with a film holding power which is stable, persistent and little dependent on temperature change, is not directly stuck onto a front face of a wrapping film container but is incorporated in a label structure including a pressure-sensitive adhesive, a substrate, and a separator. As a result, it has become possible to form a film-holding section by means of a labeler allowing automatic and continuous application thereof, while avoiding difficulties, such as complication of application operation and defects of the resultant film-holding section, such as waving and adhesion failure or turning-up at the edges, due to excessive flexibility of the wrapping film.

The invention claimed is:

1. A label for forming a film-holding section of a wrapping film container, having a laminate structure including a self-tacky film layer comprising a substantially identical material as the wrapping film, an adhesives layer, a substrate layer, a pressure-sensitive adhesive layer and a separator layer, disposed sequentially from one side of the label.

2. A label for forming a film-holding section of a wrapping film container according to claim 1, wherein detection marks for detecting individual labels are formed on each of a self-tacky film side of the substrate layer and a side opposite to the self-tacky film side of the separator layer, and the label has an entire shape of an elongated tape, so as to allow automatic application of a plurality of the individual labels.

3. A label for forming a film-holding section of a wrapping film container according to claim 2, comprising an elongated separator, and a plurality of individual labels disposed spaced apart from each other; each individual label having a laminate structure including the self-tacky film layer, the adhesive layer, the substrate layer having an individual label detection mark respectively disposed on mutually opposite surfaces thereof, and the pressure-sensitive adhesive layer.

4. A label for forming a film-holding section of a wrapping film container according to claim 3, wherein a refuse portion having a laminate structure including the self-tacky film layer, the adhesive layer, the substrate layer and the pressure-sensitive adhesive layer, is held on the separator so as to surround the individual label detection marks via slits piercing through the laminate structure.

5. A label for forming a film-holding section of a wrapping film container according to claim 2, wherein a refuse portion having a laminate structure including the self-tacky film layer, the adhesive layer, the substrate layer and the pressure-sensitive adhesive layer, is held on the separator so as to surround the individual label detection marks via slits piercing through the laminate structure.

6. A wrapping film container, comprising: an elongated container body for housing therein a rolled self-tacky wrapping film, an opening provided to the container body along a longitudinal direction of the container body for pulling out a portion of the wrapping film therethrough, cutting means for cutting the pulled-out portion of the wrapping film and a film-holding section provided on a front face of the container body for preventing re-winding to an inside of the container,
wherein the film-holding section comprises a laminate structure including a pressure-sensitive adhesive layer, a substrate layer, an adhesive layer and a self-tacky film layer comprising a substantially identical material as the wrapping film, disposed sequentially from the container body side.

7. A wrapping film container according to claim 6, wherein the self-tacky film and the wrapping film respectively comprise polyvinylidene chloride blended with a plasticizer.

* * * * *